(12) United States Patent
Kim (10) Patent No.: US 8,894,853 B2
(45) Date of Patent: Nov. 25, 2014

(54) EASY-FIT FILTER DEVICE FOR A WATER PURIFIER

(76) Inventor: Jeong Beom Kim, Seoul (KR)

( * ) Notice: Subject to any disclaimer, the term of this patent is extended or adjusted under 35 U.S.C. 154(b) by 520 days.

(21) Appl. No.: 13/102,260

(22) Filed: May 6, 2011

(65) Prior Publication Data

US 2012/0228206 A1 Sep. 13, 2012

(30) Foreign Application Priority Data

Mar. 9, 2011 (KR) .......................... 10-2011-0020767

(51) Int. Cl.
*B01D 35/30* (2006.01)
*C02F 9/00* (2006.01)
*C02F 1/44* (2006.01)
*C02F 1/00* (2006.01)
*C02F 1/28* (2006.01)

(52) U.S. Cl.
CPC ......... *C02F 9/005* (2013.01); *B01D 2201/4015* (2013.01); *C02F 1/441* (2013.01); *C02F 1/001* (2013.01); *C02F 1/283* (2013.01); *C02F 2201/006* (2013.01); *B01D 35/30* (2013.01); *C02F 2201/004* (2013.01); *B01D 2201/302* (2013.01); *C02F 1/444* (2013.01)
USPC ........... 210/232; 210/445; 210/435; 210/440; 210/441; 210/443; 210/444

(58) Field of Classification Search
USPC .......... 210/232, 445, 435, 440, 441, 443, 444
See application file for complete search history.

(56) References Cited

U.S. PATENT DOCUMENTS 5,022,986 A * 6/1991 Lang .............................. 210/94
5,154,823 A * 10/1992 Ma et al. ...................... 210/232
7,442,301 B2 * 10/2008 Huda ............................ 210/232

* cited by examiner

*Primary Examiner* — Nam Nguyen
*Assistant Examiner* — Madeline Gonzalez
(74) *Attorney, Agent, or Firm* — Robert E. Bushnell, Esq.

(57) ABSTRACT

A filter device for a water purifier including a filter unit having a flange having an inlet, an outlet, an optional discharge port, opposite engaging protrusions, and opposite engaging recesses; a connecting member fitted into the flange so as to be connected with the inlet, the outlet, and optional discharge port and having inner communicating passages so as to be connected with respective connecting holes, a cap member fitted around the flange to cover the connecting member and having on an outer circumference connecting ports communicating with the respective connecting holes, the cap member having opposite engaging holes corresponding to the engaging protrusions and opposite engaging grooves corresponding to the engaging recesses, and a fixing member engaging on an inner end with the engaging recess through the engaging groove.

14 Claims, 10 Drawing Sheets

EASY-FIT FILTER DEVICE FOR A WATER PURIFIER

CLAIM OF PRIORITY

This application makes reference to, incorporates the same herein, and claims all benefits accruing under 35 U.S.C. §119 from an application earlier filed in the Korean Intellectual Property Office on 9 Mar. 2011 and there duly assigned Serial No. 10-2011-0020767.

BACKGROUND OF THE INVENTION

1. Field of the Invention

The present invention relates, in general, to a filter device for a water purifier and, more particularly, to a filter device for a water purifier, by which a filter cartridge can be easily replaced with a new one in the water purifier.

2. Description of the Related Art

Generally, tap water is supplied to homes, business and public buildings via water pipes after purifying raw water, collected in a water intake system, in a water purification plant. However, during supplying water, the purified water is contaminated with viruses or contaminants such as heavy metals or the like, and readily become undrinkable.

Thus, in order to allow persons to drink clean water, a water purifier such as a reverse osmosis water purifier has been widely used, which includes therein a cylindrical pre-treatment filter, a reverse osmosis filter, an activated carbon filter, a micro-filter, and the like in series such that they are interconnected with a water inlet pipe, a water outlet pipe, or a discharge pipe.

However, since such a water purifier should replace its respective filters periodically according to their life cycles, the complicated installing structure in which the respective filters are interconnected with the above-mentioned pipes makes it difficult to replace the respective filters. In this case, in fact, a person who is not a skilled person is difficult to perform a replacing process.

Therefore, upon every replacement, a skilled person is needed, so that problems arise such as increased replacing cost and time and thus delayed replacement, which causes the performance of a water purifier to be degraded, problematically producing not-sufficiently purified water.

SUMMARY OF THE INVENTION

Accordingly, the present invention has been made keeping in mind the above problems occurring in the related art, and an object of the present invention is to provide a filter device for a water purifier, by which anyone who is not a skilled person can replace a filter cartridge fast and with ease.

Another object of the present invention is to provide a filter device for a water purifier, which can reduce the increased replacement cost and time and prevent degradation of the performance of the water purifier.

In an aspect of the present invention, a filter device for a water purifier, including a filter unit having a flange in which an inlet, an outlet, and optionally a discharge port extend vertically, the flange having opposite engaging protrusions on its outer circumference and opposite engaging recesses in its upper portion, a connecting member fitted into the flange at its lower portion so as to be connected with the inlet, the outlet, and optionally the discharge port and having inner communicating passages bent liked an inverted L shape so as to be connected with respective connecting holes in a circumference, a cap member fitted around the flange to cover the connecting member and having on an outer circumference connecting ports communicating with the respective connecting holes, the cap member having opposite engaging holes corresponding to the engaging protrusions and opposite engaging grooves corresponding to the engaging recesses, and a fixing member having an inner end engaging the engaging recess through the engaging groove, in which the filter unit is easily connected and disconnected from the water purifier and may be replaced with a new filter unit by turning the cap member forward and rearward about the flange within 90°.

According to the present invention, when the filter device to be replaced is unloaded from the housing of a water purifier, the fixing member is disconnected, and the cap member is turned within 90°, the cap member and the connecting member are disconnected from the filter unit, and when the above process is reversed, the filter device is easily installed in the housing of the water purifier, thereby facilitating quick, easy replacing of the filter unit.

Further, the filter device has advantages such as reduced replacing cost and time, which also solves the problem that the replacement of a filter unit is delayed so that not-sufficiently purified water is produced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
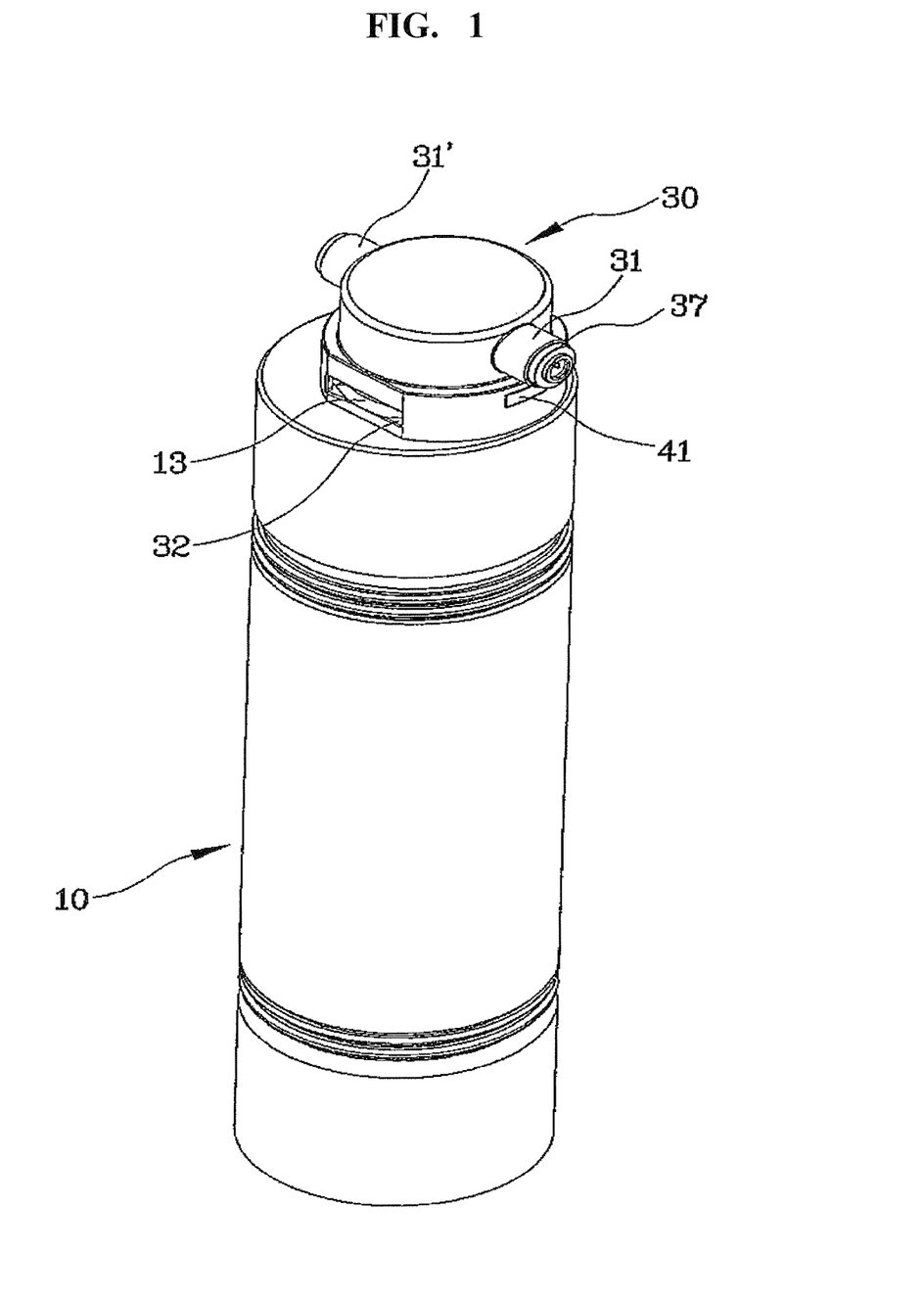
FIG. 1 is a perspective view of a filter device for a water purifier according to a first embodiment of the present invention.
Figure 2:
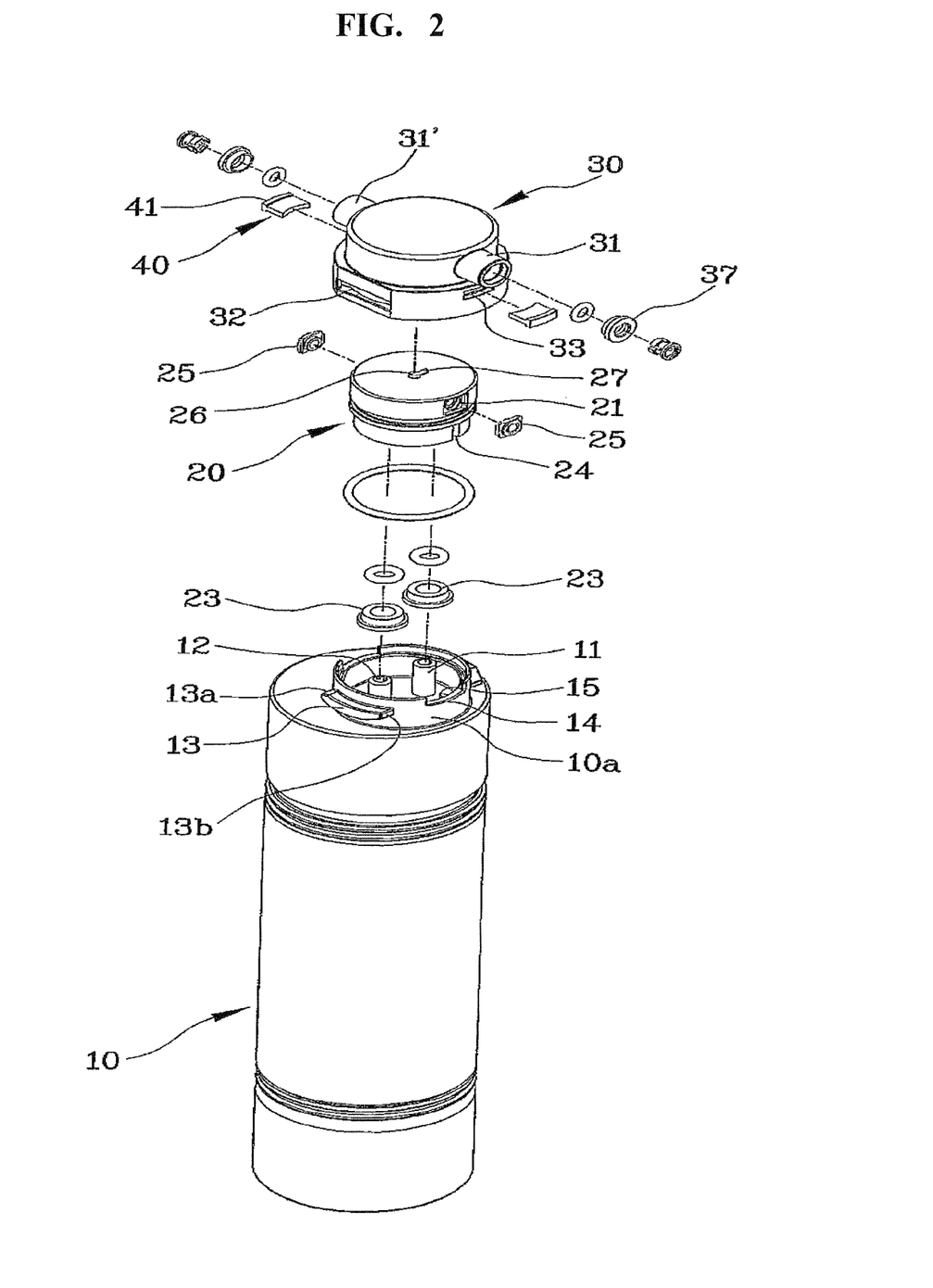
FIG. 2 is an exploded perspective view of the filter device for a water purifier shown in FIG. 1.
Figure 3:
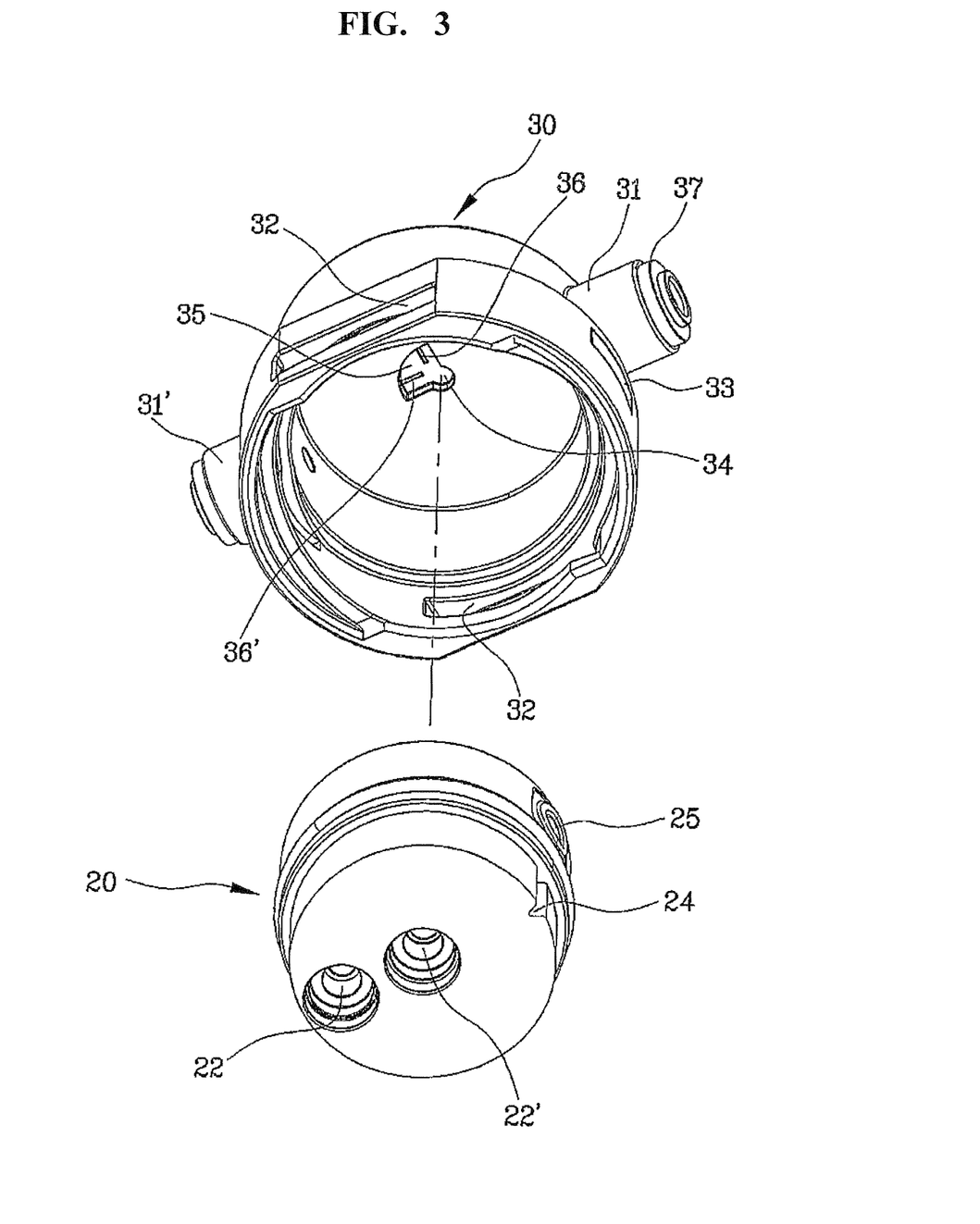
FIG. 3 is an enlarged perspective view of a connecting member and a cap member shown in FIG. 2.
Figure 4:
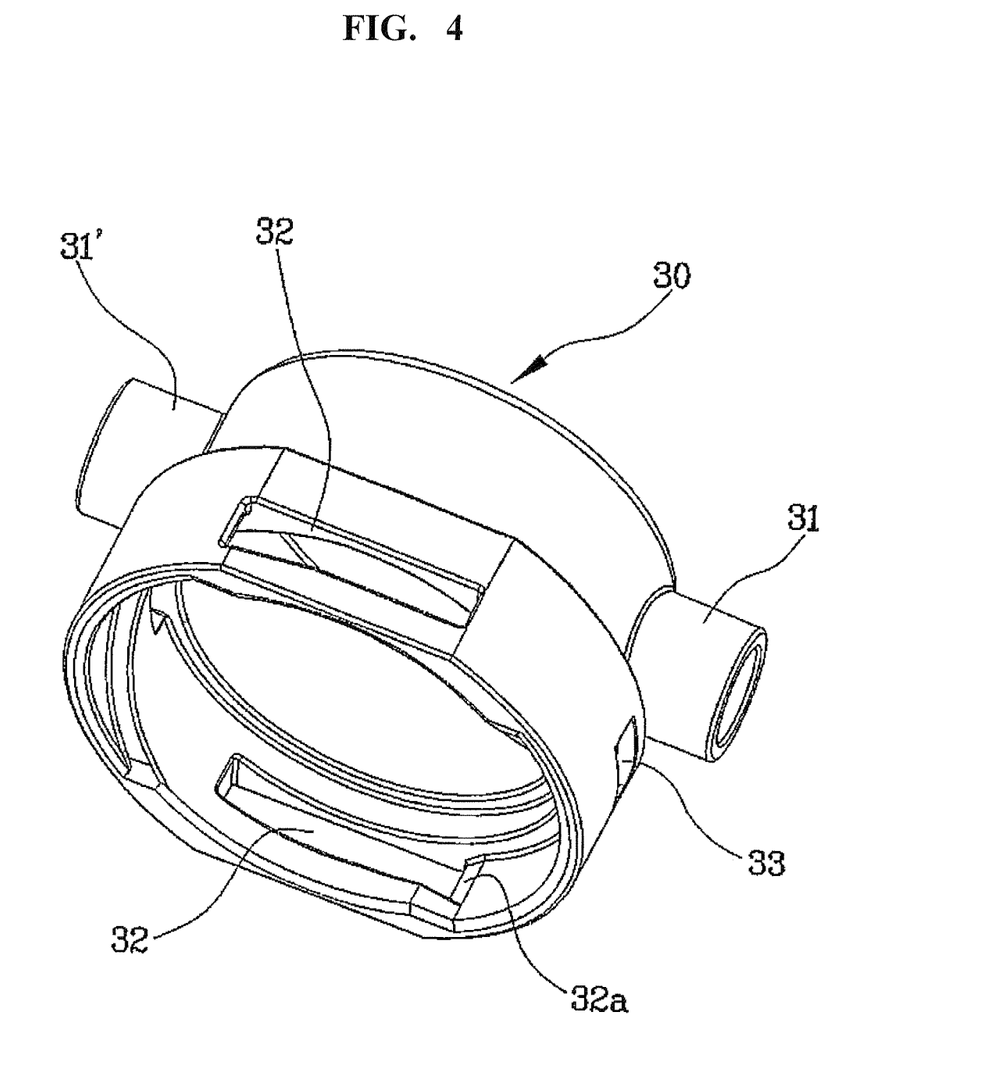
FIG. 4 is a perspective view of the cap member of FIG. 3 as viewed in a different direction.
Figure 5:
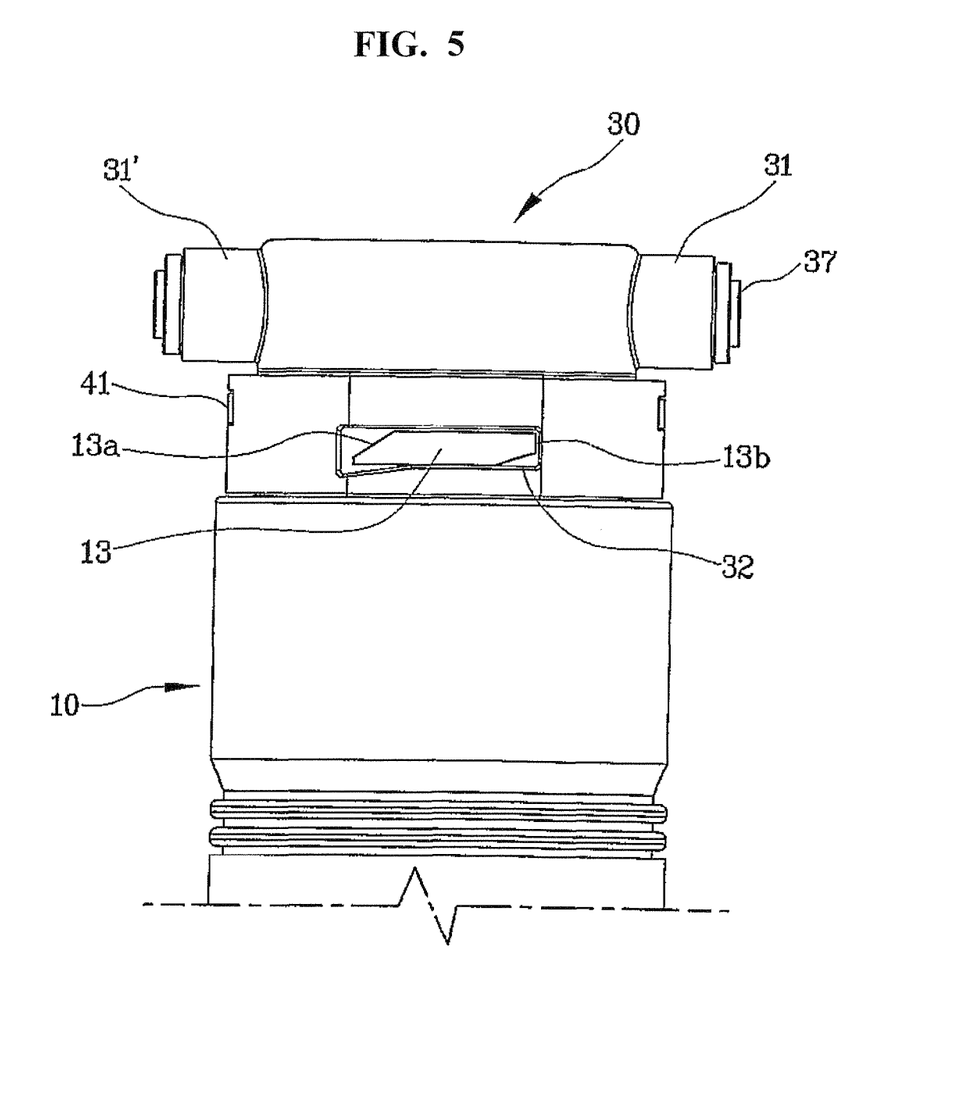
FIG. 5 is an enlarged front view of the upper portion of FIG. 1.
Figure 6:
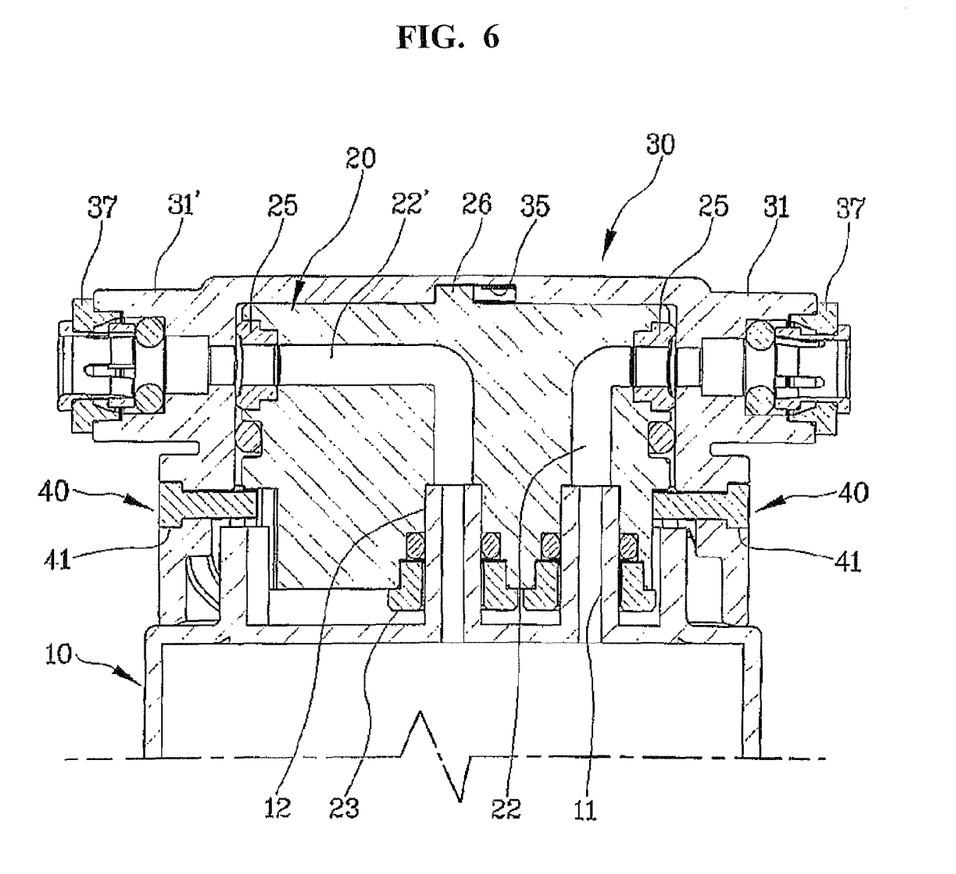
FIG. 6 is an enlarged cross-sectional view of FIG. 5.

FIG. 1 is a perspective view of the filter device for the water purifier according to the first embodiment of the present invention, FIG. 2 is an exploded perspective view of the filter device for the water purifier shown in FIG. 1, FIG. 3 is an enlarged perspective view of the connecting member and the cap member shown in FIG. 2, FIG. 4 is a perspective view of the cap member of FIG. 3 as viewed in a different direction, FIG. 5 is an enlarged front view of the upper portion of FIG. 1, and FIG. 6 is an enlarged cross-sectional view of FIG. 5.

The filter device for the water purifier includes a filter unit 10 having a flange 10a in which an inlet 11 and an outlet 12 extend vertically, the flange having opposite engaging protrusions 13 on its outer circumference and opposite engaging recesses 32 in its upper portion, a connecting member 20 fitted into the flange at its lower portion so as to be connected with the inlet and outlet and having inner communicating passages 22 and 22' bent liked an inverted L shape so as to be connected with respective connecting holes 21 and 21' in a circumference, a cap member fitted around the flange to cover the connecting member and having on an outer circumference connecting ports 31 and 31' communicating with the respective connecting holes, the cap member having opposite engaging holes 32 corresponding to the engaging protrusions and opposite engaging grooves 33 corresponding to the engaging recesses, and a fixing member 40 engaging on an inner end with the engaging recess through the engaging groove.

The filter unit has a cylindrical shape and includes a pretreatment filter, a reverse osmosis filter, an activated carbon filter, a micro-filter, and the like.

The outlet 12 is located in the center of the upper portion of the filter unit, and the inlet 11 is located near the outlet.

The engaging protrusions 13 and the engaging recesses 14 respectively cross each other, and the engaging protrusion 13 has a left end 13a having a slant face inclined upwards and a plain right end 13b having a vertical face.

As described later, the left end 13a is provided such that when the cap member 30 is reversely turned so as to be decoupled from the flange 10a, a left inner face of the engaging hole 32 moves upwards along the slant face of the left end 13a of the engaging protrusion 13 and is smoothly disconnected away from the engaging protrusion so that the cap member is quickly decoupled from the flange.

The right end 13b is provided such that when the cap member 30 is turned so as to be coupled to the flange 10a, a right face of the engaging hole 32 contacts the right end 13b and completely engages with the engaging recess 14 so as to prevent the cap member from being turned.

The connecting member 20 is of a cylindrical form, a lower portion of which is fitted into the flange 10a such that the inner communicating passages 22 and 22' are respectively connected with the inlet 11 and the outlet 12. A ring type packing cap 23 is fitted into the respective communicating passage 22 and 22'.

Thus, when the connecting member 20 is fitted into the flange 10a, the inlet 11 and the outlet 12 are connected with the communicating passages 22 and 22' while coming into close contact with the packing caps 23, thereby preventing water leakage.

The flange 10a and the connecting member 20 are respectively provided with an inner guide protrusion 15 and an outer guide slot 24, so that when the connecting member is fitted into the flange while the guide protrusion is inserted through the guide slot, the inlet 11 and the outlet 12 are connected with the communicating passages 22 and 22', respectively.

A packing cap 25 is also fitted into the respective connecting hole 21 and 21', so that when the cap member 30 is coupled to the flange 10a, an inner surface of the connecting port 31 and 31' comes into close contact with the packing cap, thereby preventing the water leakage.

The connecting member 20 has an axis pin 26 in the center of an upper portion and a stopper protrusion 27 laterally extending from the axis pin, and correspondingly the cap member 30 has a central axis groove 34 and a stopper groove 35 which is provided adjacent the axis groove 34 and is shaped like a right-angled sector form, so that the cap member can turn about the connecting member within 90° with the stopper protrusion engaged through the axis groove. The stopper groove 35 has stopper steps 36 and 36' adjacent opposite faces thereof.

Thus, when the cap member is coupled to the connecting member 20 fitted into the flange 10a, the axis pin 26 is inserted into the axis groove 34 so as to turn the cap member about the axis pin. In this state, the stopper protrusion 27 is located in the stopper groove 35, so that the cap member can be turned forward and rearward within 90°, which is an allowable range that the stopper protrusion moves, and also the stopper protrusion is selectively engaged with the stopper steps 36 and 36' so that the cap member is prevented from arbitrarily turning forward and rearward.

The stopper protrusion 27 and the stopper groove 35 are located such that when the cap member 30 coupled to the flange 10a is turned forward at 90° so that the engaging protrusion 13 is completely engaged with the engaging hole 32, the cap member stops turning. In the engaged state, the engaging groove 33 coincides with the engaging recess 14.

Here, when the fixing member 40 is horizontally coupled to the assembly through the respective engaging grooves 33 such that the inner end thereof is engaged with the engaging recess 14, the cap member 30 cannot turn rearward in a state being coupled to the flange, and also the engaging protrusion 12 engages with the engaging hole 32, so that the cap member is firmly coupled to the assembly such that it is neither turned forward and rearward nor disconnected upwards.

The fixing member 40 is formed with a plate form having engaging steps 41 on upper and lower surface of an outer end so as to come into contact with the inner end of the engaging groove 33 and thus prevent the fixing member from being completely inserted into the engaging groove 33.

In the coupled state, the filter device is installed in the housing of a water purifier so that hoses are connected to the respective connecting ports 31 and 31', into which packing caps 37 are coupled in order to prevent water leakage, and then the housing is covered with a cover, finally completing the assembly of the filter device with the water purifier.

When replacing a filter unit with a new one, the cover is opened, the hoses are disconnected from the connecting ports 31 and 31', the filter device is unloaded from the housing, the fixing member 40 is detached to unlock the cap member 30, the cap member is reversely turned at 90° so that the engaging hole 32 is disconnected from the engaging protrusion 13 and the cap member is disconnected, the connecting member 20 is disconnected from the flange 10a and then is connected to the new filter unit, and a new filter device with the new filter unit is mounted in the housing of a water purifier through the above-mentioned mounting process, finally completing the replacing of the filter unit.

Figure 7:
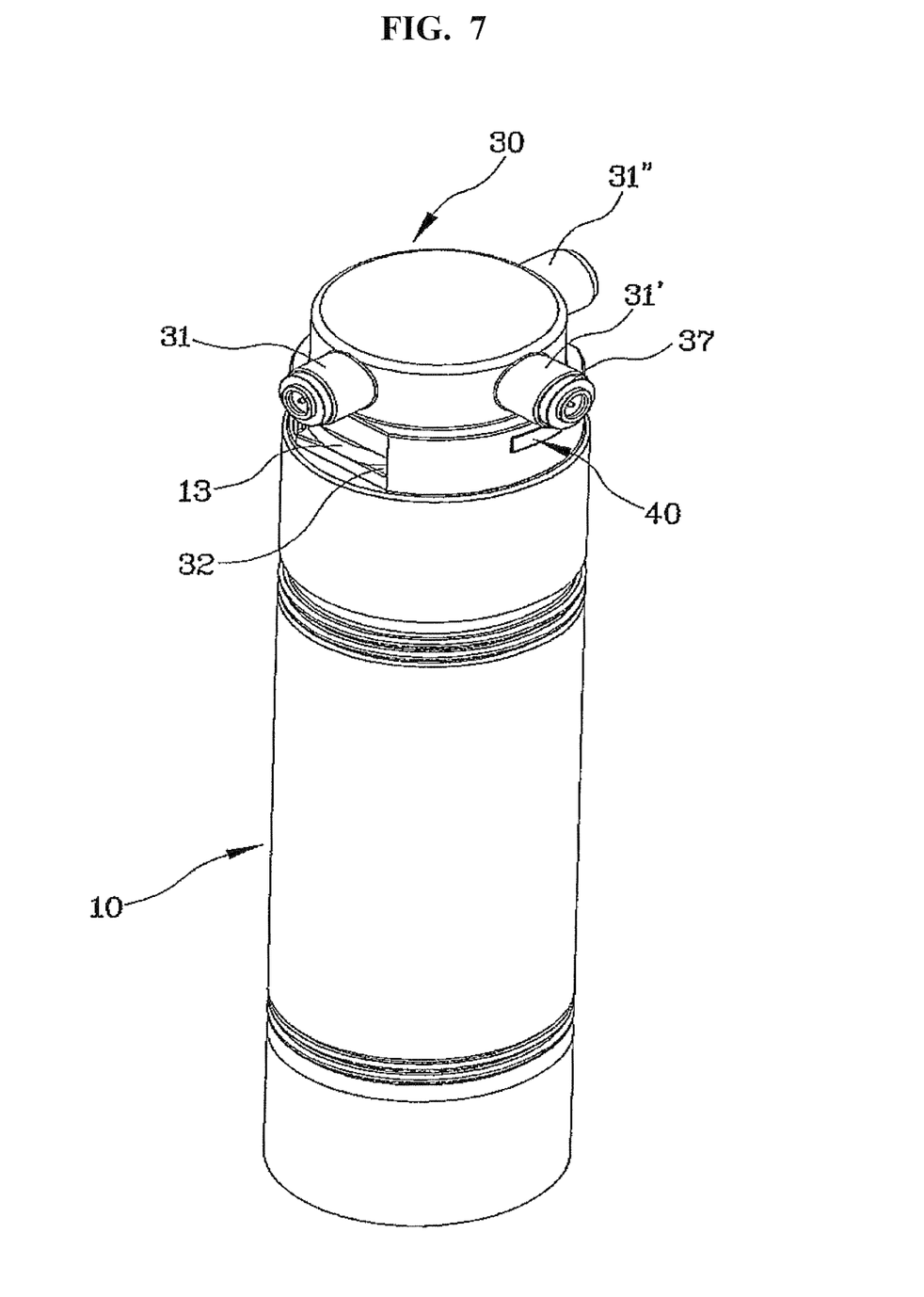
FIG. 7 is a perspective view of a filter device for a water purifier according to a second embodiment of the present invention.
Figure 8:
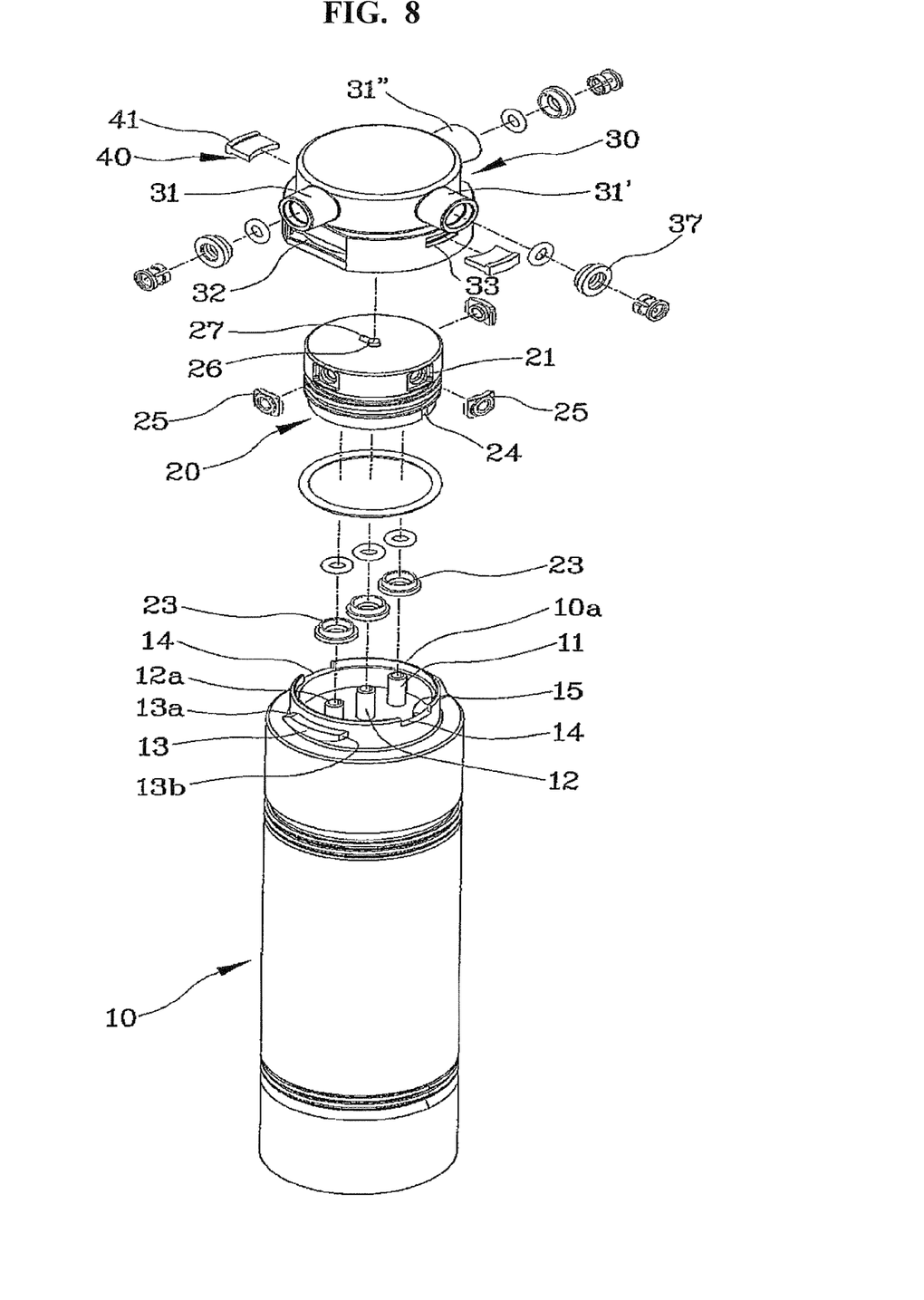
FIG. 8 is an exploded perspective view of the filter device for the water purifier shown in FIG. 7.
Figure 9:
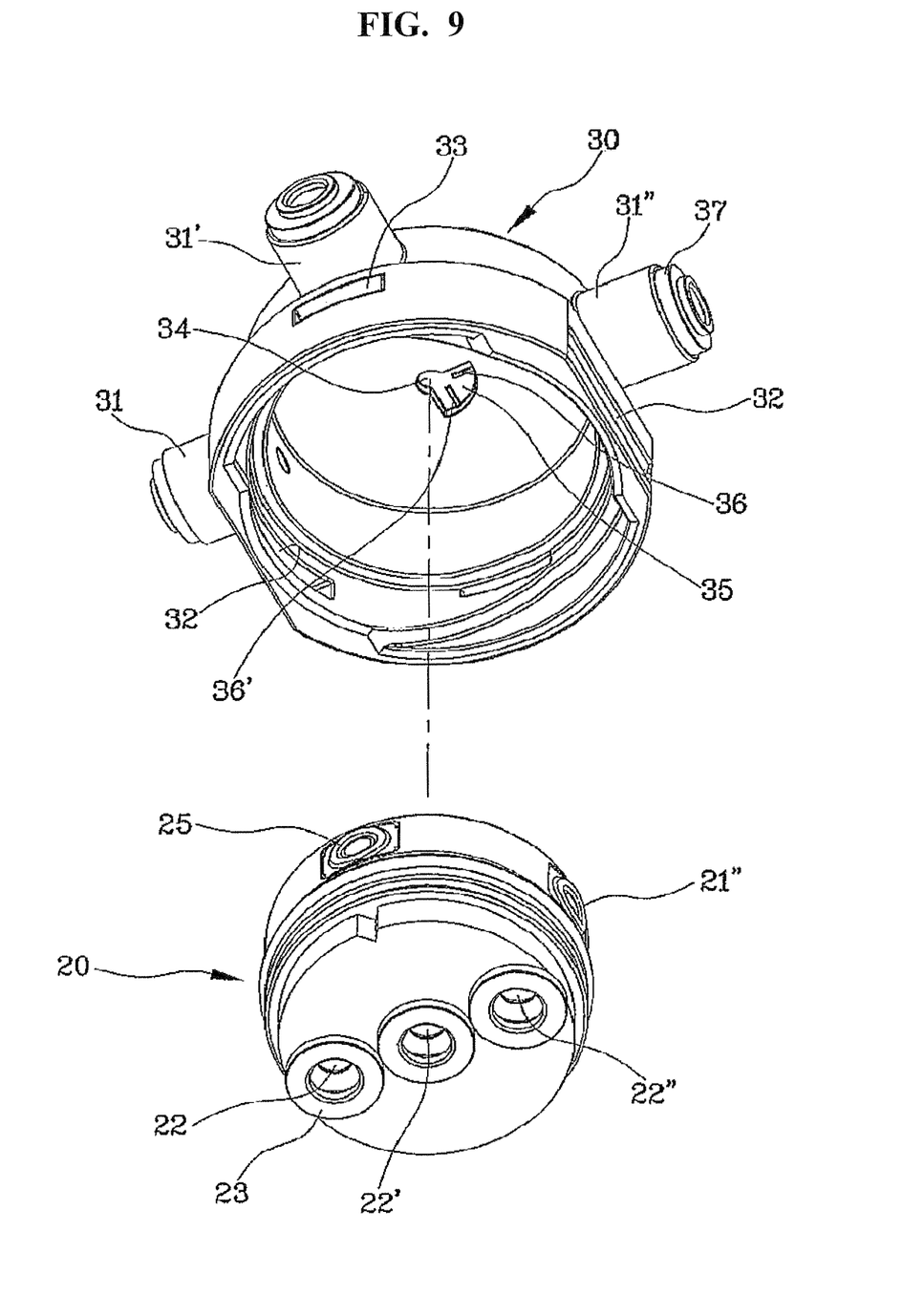
FIG. 9 is an enlarged perspective view of a connecting member and a cap member shown in FIG. 8.
Figure 10:
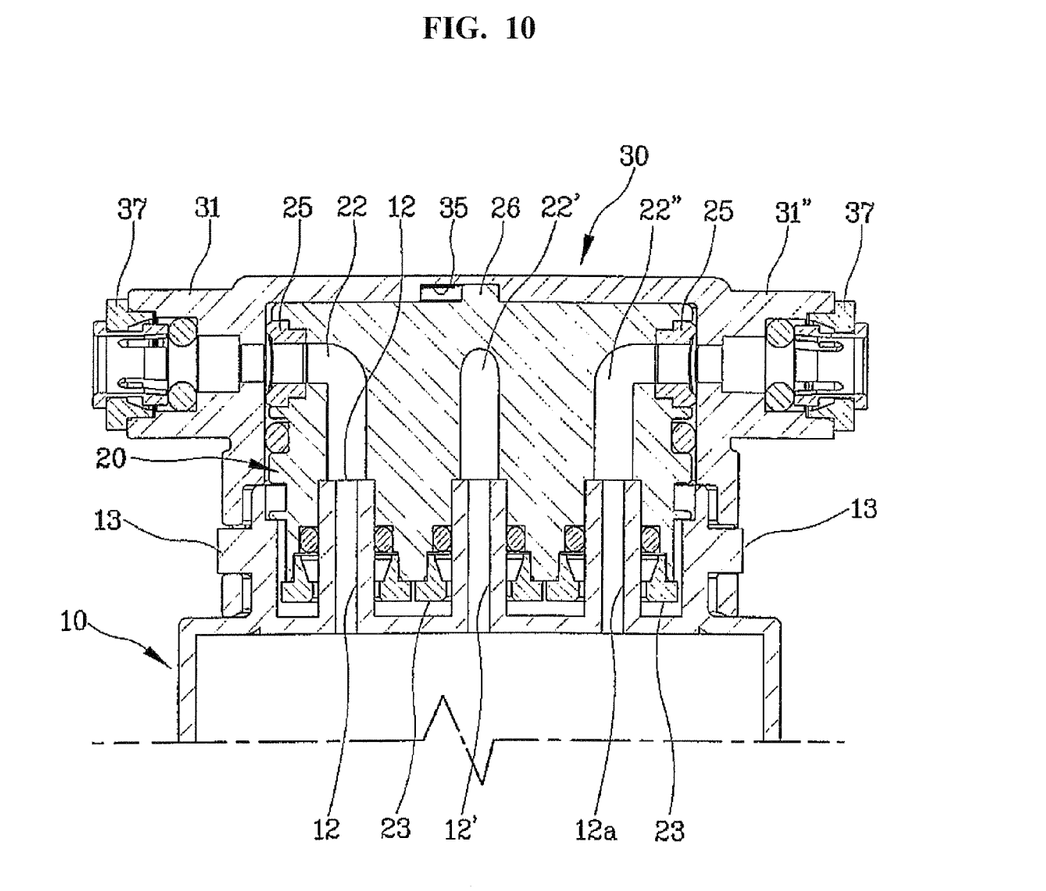
FIG. 10 is an enlarged sectional view of the upper portion of FIG. 7.

FIG. 7 is a perspective view of an adapter structure for a filter cartridge of a water purifier according to a second embodiment of the present invention, FIG. 8 is an exploded perspective view of the adapter structure for a filter cartridge of a water purifier shown in FIG. 7, FIG. 9 is an enlarged perspective view of a connecting member and a cap member shown in FIG. 8, and FIG. 10 is an enlarged sectional view of the upper portion of FIG. 7.

The filter unit 10, the connecting member 20, the cap member 30, and the fixing member 40 of the filter device of the second embodiment are substantially the same as those of the first embodiment, except that the filter unit 10 further has a discharge port 12a in addition to the inlet 11 and the outlet 12, the connecting member 20 has three communicating passages 22, 22', and 22" bent liked an inverted L shape, and the cap member 30 has three connecting ports 31, 31', and 31".

That is, the filter device of this embodiment includes the filter unit 10 having the flange 10a in which the inlet 11, the outlet 12, and the discharge port 12a extend vertically, the flange having opposite engaging protrusions 13 on its outer circumference and opposite engaging recesses 32 in its upper portion, a connecting member 20 that fits into the flange at its lower portion so as to be connected with the inlet, the outlet, and the discharge port and having inner communicating passages 22, 22', and 22" bent liked an inverted L shape so as to be connected with respective connecting holes 21, 21', and 21" in a circumference, a cap member fitted around the flange to cover the connecting member and having on an outer circumference connecting ports 31, 31', and 31" communicating with the respective connecting holes, the cap member having opposite engaging holes 32 corresponding to the engaging protrusions and opposite engaging grooves 33 corresponding to the engaging recesses, and a fixing member 40 engaging on an inner end with the engaging recess through the engaging groove.

Similar to the first embodiment, the ring type packing caps 23, 25, and 37 are fitted into the respective communicating passage 22, 22', and 22", the connecting holes 21, 21', and 21", and the connecting ports 31, 31', and 31", respectively.

Thus, when the connecting member 20 is fitted into the flange 10a, the inlet 11, the outlet 12, and the discharge port 12a are connected with the communicating passages 22, 22', and 22" while coming into close contact with the packing caps 23, thereby preventing water leakage.

Further, when the cap member 30 is coupled to the flange 10a, an inner surface of the connecting port 31, 31', and 31" comes into close contact with the outer end of the connecting hole 21, 21', and 21" through the packing cap 25, thereby preventing the water leakage.

Like this, when the cap member 30 is coupled to the flange 10a, the engaging grooves 33 coincide with the engaging recesses 14, so that when the fixing member 40 is horizontally coupled to the assembly through the respective engaging grooves 33 such that the inner end thereof is engaged with the engaging recess 14, the cap member 30 cannot turn rearward in a state being coupled to the flange, and also the engaging protrusion 12 engages with the engaging hole 32, so that the cap member is firmly coupled to the assembly such that it is neither turned forward and rearward nor disconnected upwards.

In the coupled state, the filter device is installed in the housing of a water purifier so that hoses are connected to the respective connecting ports 31, 31', and 31", into which packing caps 37 are coupled in order to prevent water leakage, and then the housing is covered with a cover, finally completing the assembly of the filter device with the water purifier.

In the meantime, when replacing a filter unit with a new one, the cover is opened, the hoses are disconnected from the connecting ports 31, 31', and 31", the filter device is unloaded from the housing, the fixing member 40 is detached to unlock the cap member 30, the cap member is reversely turned at 90° so that the engaging hole 32 is disconnected from the engaging protrusion 13 and the cap member is disconnected, the connecting member 20 is disconnected from the flange 10a and then is connected to the new filter unit, and a new filter device with the new filter unit is mounted in the housing of a water purifier through the above-mentioned mounting process, finally completing the replacing of the filter unit.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A filter device for a water purifier, comprising:
   a filter unit having a flange in which an inlet and an outlet extend vertically, the flange having opposite engaging protrusions on its outer circumference and opposite engaging recesses in its upper portion;
   a connecting member fitted into the flange at its lower portion and connected with the inlet and the outlet and having inner communicating passages bent like an inverted L shape to connect with respective connecting holes in a circumference;
   a cap member fitted around the flange to cover the connecting member and having on an outer circumference connecting ports communicating with the respective connecting holes, the cap member having opposite engaging holes corresponding to the engaging protrusions and opposite engaging grooves corresponding to the engaging recesses; and
   a fixing member engaging on an inner end with the engaging recess through the engaging groove.

2. A filter device for a water purifier, comprising:
   a filter unit having a flange in which an inlet, an outlet, and a discharge port extend vertically, the flange having opposite engaging protrusions on its outer circumference and opposite engaging recesses in its upper portion;
   a connecting member fitted into the flange at its lower portion and connected with the inlet, the outlet, and the discharge port and having inner communicating passages bent like an inverted L shape to connect with respective connecting holes in a circumference;
   a cap member fitted around the flange to cover the connecting member and having on an outer circumference connecting ports communicating with the respective connecting holes, the cap member having opposite engaging holes corresponding to the engaging protrusions and opposite engaging grooves corresponding to the engaging recesses; and
   a fixing member engaging on an inner end with the engaging recess through the engaging groove.

3. The filter device for the water purifier according to claim 1, comprised of the flange and the connecting member respectively provided with an inner guide protrusion and an outer guide slot through which the guide protrusion is inserted.

4. The filter device for the water purifier according to claim 3, further comprising of:
   the connecting member having an axis pin in the center of an upper portion and a stopper protrusion laterally extending from the axis pin, and
   the cap member having a central axis groove and a stopper groove which is provided adjacent to the axis groove to facilitate the cap member turning forward and rearward against the connecting member in the stopper groove within 90° about the axis groove with the stopper protrusion movably engaged with the stopper groove, the stopper groove having stopper steps adjacent to opposite faces thereof.

5. The filter device for the water purifier according to claim 2, further comprised of the flange and the connecting member respectively provided with an inner guide protrusion and an outer guide slot through which the inner guide protrusion is inserted.

6. The filter device for the water purifier according to claim 3, comprised of each of the engaging protrusions having a left end with a slant face inclined upwards and a plain right end with a vertical face, respectively crosses with each of the engaging recesses.

7. The filter device for the water purifier according to claim 4, comprised of the connecting member of a cylindrical form, having:
   a ring type packing cap fitted into the respective communicating passage; and
   a packing cap fitted into the respective connecting hole which has close contact with the inner surface of the respective connecting port of the cap member.

8. The filter device for the water purifier according to claim 7, comprised of the fixing member having a plate form with an outer end having engaging step on upper and lower surfaces contacting the inner surface of the engaging groove without being completely inserted into the engaging groove, and the fixing member is coupled, through the respective engaging groove, to the assembly of the filter unit, the connecting member, and the cap member.

9. The filter device for the water purifier according to claim 1, further comprised of the filter unit having a cylindrical shape and including a pre-treatment filter, a reverse osmosis filter, an activated carbon filter, and a micro-filter.

10. The filter device for the water purifier according to claim 5, further comprised of each of the engaging protrusions having a left end with a slant face inclined upwards and a plain right end with a vertical face, respectively crosses with each of the engaging recesses.

11. The filter device for the water purifier according to claim 5, further comprised of the connecting member having an axis pin at the center of an upper portion with a laterally extended stopper protrusion; and
   the cap member having a central axis groove corresponding to the axis pin enabling turning forward and rearward with respect to the connecting member within 90°, and the cap member has a stopper groove of a shape of a right-angled sector form and the stopper groove has steps to engage with the stopper protrusion, in which the steps are adjacent to opposite surfaces in the stopper groove.

12. The filter device for the water purifier according to claim 11, comprised of the connecting member of a cylindrical form, having:
   a ring type packing cap fitted into the respective communicating passage; and
   a packing cap fitted into the respective connecting hole which has close contact with the inner surface of the respective connecting port of the cap member.

13. The filter device for the water purifier according to claim 12, comprised of the fixing member having a plate form with an outer end having engaging step on upper and lower surfaces contacting the inner surface of the engaging groove without being completely inserted into the engaging groove, and the fixing member is coupled, through the respective engaging groove, to the assembly of the filter unit, the connecting member, and the cap member.

14. The filter device for the water purifier according to claim 2, comprised of the filter unit having a cylindrical shape and including a pre-treatment filter, a reverse osmosis filter, an activated carbon filter, and a micro-filter.

* * * * *